(12) United States Patent
Wootten (10) Patent No.: US 8,521,469 B2
(45) Date of Patent: Aug. 27, 2013

(54) SYSTEM AND METHOD FOR DETERMINING AN ORIENTATION OF A DEVICE

(75) Inventor: Keith Robert Wootten, Berkshire (GB)

(73) Assignee: General Electric Company, Schenectady, NY (US)

( * ) Notice: Subject to any disclaimer, the term of this patent is extended or adjusted under 35 U.S.C. 154(b) by 361 days.

(21) Appl. No.: 12/840,615

(22) Filed: Jul. 21, 2010

(65) Prior Publication Data

US 2012/0022825 A1   Jan. 26, 2012

(51) Int. Cl.
*G01V 11/00* (2006.01)

(52) U.S. Cl.
USPC ...... 702/151; 324/207.13; 324/174; 384/448; 702/6

(58) Field of Classification Search
USPC ............ 702/6, 151; 324/321, 316, 307, 324/207.25, 207.13, 174, 207.12, 207.23, 324/207.2, 207.21; 384/448; 310/90.5
See application file for complete search history.

(56) References Cited

U.S. PATENT DOCUMENTS

| 3,896,412 | A | | 7/1975 | Rohr |
| 4,021,774 | A | | 5/1977 | Asmundsson et al. |
| 4,174,577 | A | | 11/1979 | Lewis |
| 4,893,290 | A | | 1/1990 | McNeel et al. |
| 5,747,750 | A | | 5/1998 | Bailey et al. |
| 5,917,160 | A | | 6/1999 | Bailey |
| 6,097,129 | A | * | 8/2000 | Furtwangler et al. ......... 310/256 |
| 6,120,568 | A | * | 9/2000 | Neff ................................. 51/297 |
| 6,922,373 | B2 | * | 7/2005 | Armstrong ...................... 367/73 |
| 7,145,326 | B2 | * | 12/2006 | Rhodes et al. ........... 324/207.21 |
| 7,281,578 | B2 | | 10/2007 | Nakajima et al. |
| 7,834,618 | B2 | * | 11/2010 | Moura et al. ............. 324/207.26 |
| 2008/0294344 | A1 | * | 11/2008 | Sugiura .............................. 702/6 |

\* cited by examiner

*Primary Examiner* — Carol S Tsai
(74) *Attorney, Agent, or Firm* — Armstrong Teasdale LLP (57) ABSTRACT

A relative bearing sensor for determining an orientation of a device. The relative bearing sensor including a ferromagnetic housing, and wherein the ferromagnetic housing includes a ferromagnetic ball configured to roll with respect to an orientation of the ferromagnetic housing, a magnetic flux sensor, a permanent magnet configured to emit a plurality of magnetic flux lines through the magnetic flux sensor, the plurality of magnetic flux lines steered by a location of the ferromagnetic ball, and a processor programmed. The processor is programmed to determine a flux angle of the plurality of magnetic flux lines, compare the determined flux angle with a predefined flux angle, and determine an orientation of the relative bearing sensor based on the comparing.

17 Claims, 5 Drawing Sheets

SYSTEM AND METHOD FOR DETERMINING AN ORIENTATION OF A DEVICE

BACKGROUND OF THE INVENTION

The field of the disclosure relates generally to a relative bearing sensor, and more specifically to a system and method for determining an orientation of a relative bearing sensor.

A well logging tool is used to provide a detailed record of geologic formations penetrated by a borehole. Conventional well logging tools utilize multiple sensors located on a perimeter of the well logging tool in order to acquire physical measurements. However, in a well containing fluids of differing densities, less dense fluids (e.g., gasses) tend to flow along a topmost part of a well bore. Therefore, in order to provide an accurate record of acquired measurements, for example, a location of the fluids within the well, it is important to know an orientation of the well logging tool itself.

Conventionally, it is difficult to guarantee an orientation of a well logging tool. Current solutions used to determine an orientation of a logging tool suffer badly from bearing stiction due in part to a size and weight of an orientation device necessary for determining an orientation of the logging tool. Further, current devices used for determining an orientation of a logging tool are difficult to manufacture, require time consuming adjustments, are inaccurate, and expensive.

BRIEF DESCRIPTION OF THE INVENTION

In one aspect, a relative bearing sensor for determining an orientation of a device is provided. The relative bearing sensor including a ferromagnetic housing, and wherein the ferromagnetic housing includes a ferromagnetic ball configured to roll with respect to an orientation of the ferromagnetic housing, a magnetic flux sensor, a permanent magnet configured to emit a plurality of magnetic flux lines through the magnetic flux angle sensor, the plurality of magnetic flux lines steered by a location of the ferromagnetic ball, and a processor programmed. The processor is programmed to determine a flux angle of the plurality of magnetic flux lines, compare the determined flux angle with a predefined flux angle, and determine an orientation of the relative bearing sensor based on the comparing.

In another aspect, a method for determining an orientation of a device is provided. The method includes detecting a plurality of magnetic flux lines, determining a flux angle of the plurality of magnetic flux lines, comparing the determined flux angle with a predefined flux angle, and determining an orientation of the device based on the comparing.

In yet another aspect, one or more computer-readable media having computer-executable components is provided. The components include a flux angle measuring component that when executed by at least one processor causes the at least one processor to calculate a flux angle of a plurality of magnetic flux lines emitted from a permanent magnet in a relative bearing sensor coupled to a device, a memory component that when executed by at least one processor causes the at least one processor to access a predefined flux angle, and an orientation component that when executed by at least one processor causes the at least one processor to determine an orientation of the device by comparing the determined flux angle of the plurality of magnetic flux lines with the predefined flux angle.

BRIEF DESCRIPTION OF THE DRAWINGS

The present disclosure is described in detail below with reference to the attached drawing figures.

DETAILED DESCRIPTION OF THE INVENTION

Embodiments of the present disclosure enable an inclinometer (e.g., relative bearing sensor 102) to determine an orientation of, for example, an oil well logging tool, in a deviated (non-vertical) well. However, while embodiments of the present disclosure are illustrated and described herein with reference to well a logging tool, and in particular to a relative bearing sensor 102 used to determine an orientation of a well logging tool, aspects of the present disclosure are operable with any device that performs the functionality illustrated and described herein, or its equivalent.

An exemplary technical effect of the methods and systems described herein includes at least one of (a) detecting a plurality of magnetic flux lines; (b) determining a flux angle of the plurality of magnetic flux lines; (c) comparing the determined flux angle with a predefined flux angle; and (d) determining an orientation of a device based on the comparing.

Figure 1:
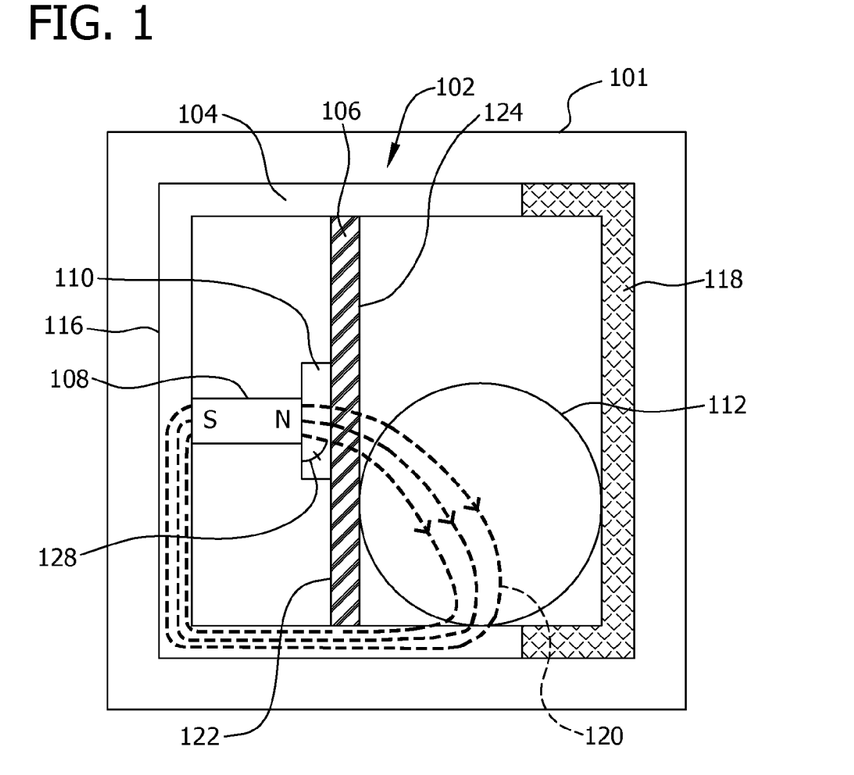
FIG. 1 is a block diagram of a relative bearing sensor within a well logging tool.

With reference now to FIG. 1, a block diagram of an exemplary relative bearing sensor 102 that is, for example, physically coupled to or within well logging tool 101 is provided. One of ordinary skill in the art will appreciate that the diagram of FIG. 1 is merely illustrative of an exemplary relative bearing sensor that can be used in connection with one or more embodiments of the disclosure, and is not intended to be limiting in any way. Further, with respect to an orientation of well logging tool 101 and relative bearing sensor 102, an orientation of relative bearing sensor 102 is related to an orientation of well logging tool 101. Thus, if an orientation of well logging tool 101 changes, the orientation of relative bearing sensor 102 also changes. Therefore, an orientation of well logging tool 101 may be determined from an orientation of relative bearing sensor 102.

Figure 2:
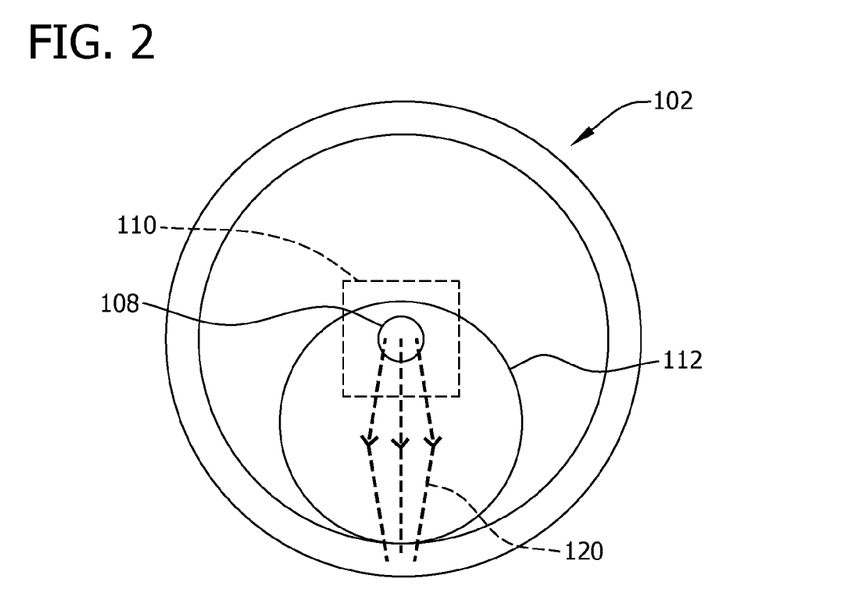
FIG. 2 is a cross section of a relative bearing sensor.

In embodiments, relative bearing sensor 102 includes a cylindrical ferromagnetic housing 104 that includes a magnetic first end 116 and a non-magnetic second end 118 opposite magnetic first end 116. Ferromagnetic housing 104 further includes a printed circuit board (PCB) 106 substantially parallel to magnetic first end 116. Between PCB 106 and magnetic first end 116, ferromagnetic housing 104 includes a magnetic flux sensor 110 coupled between a permanent magnet 108 and a first surface 122 of PCB 106. Magnetic flux sensor 110 enables a detection of a plurality of magnetic flux lines 120 emitted from permanent magnet 108. In embodiments, magnetic flux lines 120 are steered by a location of a ferromagnetic ball 112 that is moveably positioned with respect to a second surface 124 of PCB 106. For example, as an orientation of well logging tool 101 changes, an orientation of relative bearing sensor 102 also changes and ferromagnetic ball 112 is configured to roll with respect to the change in orientation of relative bearing sensor 102 due to a gravitational force placed on ferromagnetic ball 112. For example, as shown FIG. 1, the orientation of well logging tool 101 causes ferromagnetic ball 112 within relative bearing sensor 102 to roll to a lowest part of ferromagnetic housing 104. (See also FIG. 2, which is a cross section of relative bearing sensor 102 with ferromagnetic ball 112 at a lowest part of ferromagnetic housing 104). In embodiments, ferromagnetic ball 112 is large enough to overcome friction, which enables a gravitational force to move ferromagnetic ball 112 with respect to an orientation of well logging tool 101.

Figure 3:
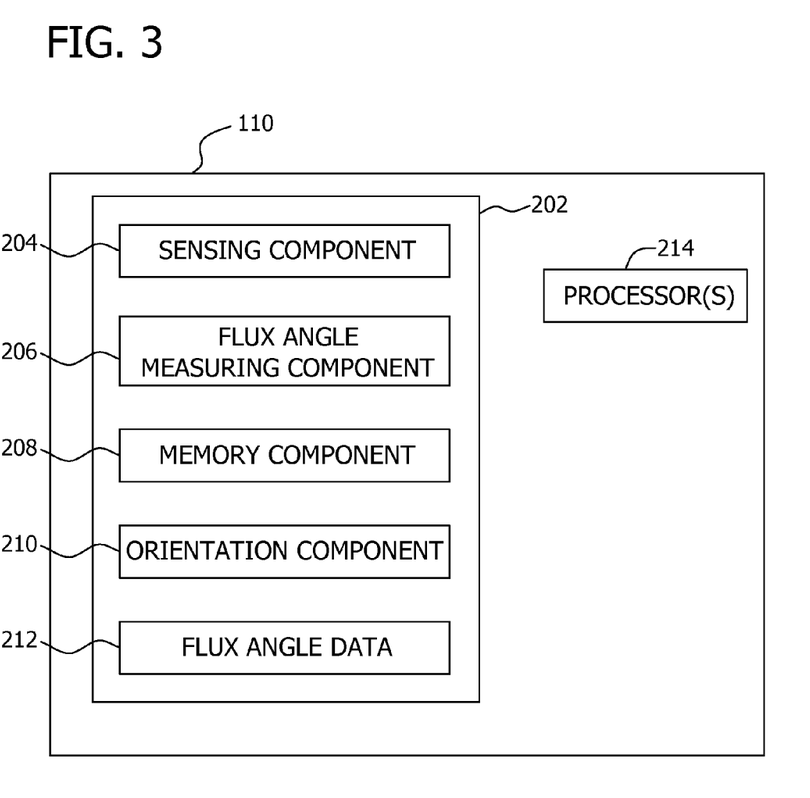
FIG. 3 is an exemplary block diagram of computer-executable components stored in a memory area of a relative bearing sensor for determining an orientation of a well logging tool.

Referring now to FIG. 3, magnetic flux sensor 110 includes a memory area 202 and at least one processor 214. The diagram of FIG. 3 is merely illustrative of an exemplary magnetic flux sensor 110 that can be used in connection with one or more embodiments of the present disclosure, and is not intended to be limiting in any way. For example, although processor 214 is shown separate from memory area 202, embodiments of the present disclosure contemplate that memory area 202 may be onboard processor 214, such as in some embedded systems.

Memory area 202, or other computer-readable media, stores flux angle data 212 and computer-executable components for determining an orientation of a device, such as well logging tool 101. Exemplary components include, but are not limited to, a sensing component 204, a flux angle measuring component 206, a memory component 208, and an orientation component 210. While the components are shown to be stored in memory area 202, the components may be stored and executed from a memory area remote from magnetic flux sensor 110. Such embodiments reduce the computational and storage burden on magnetic flux sensor 110.

Processor 214 executes computer-executable instructions for implementing aspects of the disclosure. In some embodiments, processor 214 is transformed into a special purpose microprocessor by executing computer-executable instructions or by otherwise being programmed. For example, processor 214 may execute sensing component 204, flux angle measuring component 206, memory component 208, and orientation component 210. Sensing component 204, when executed by processor 214, causes processor 214 to detect a presents of magnetic flux lines 120. Thus, as shown in FIG. 1, as magnetic flux lines 120 are emitted from permanent magnet 108, sensing component 204 detects magnetic flux lines 120 as magnetic flux lines 120 pass through sensing component 204. Flux angle measuring component 206, when executed by processor 214, causes processor 214 to calculate a flux angle (see flux angle 128 shown in FIG. 1) of magnetic flux lines 120 emitted from permanent magnet 108 as magnetic flux lines 120 pass through sensing component 204.

Figure 4:
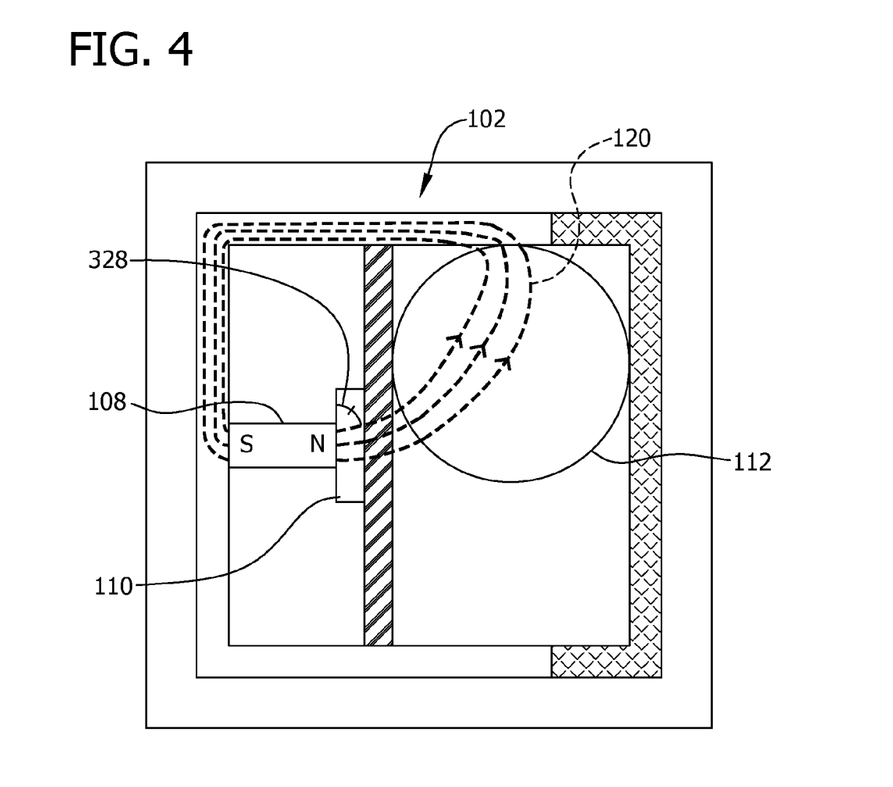
FIG. 4 is a block diagram illustrating a path of a plurality of magnetic flux lines emitted from a permanent magnet inside a relative bearing sensor.
Figure 5:
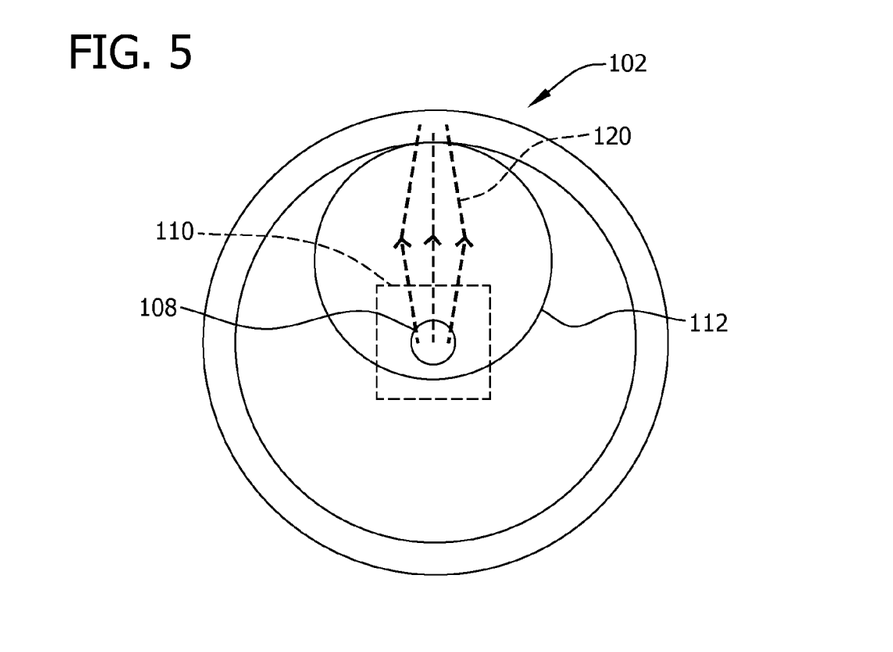
FIG. 5 is a cross section of a relative bearing sensor illustrating a path of a plurality of magnetic flux lines emitted from a permanent magnet inside the relative bearing sensor.

As mentioned above, magnetic flux lines 120 are steered by a location of a ferromagnetic ball 112. Therefore, as ferromagnetic ball 112 moves, magnetic flux lines 120 are steered toward a location of ferromagnetic ball 112. For example, as shown in FIGS. 4 and 5, due to a first orientation of well logging tool 101, ferromagnetic ball 112 within relative bearing sensor 102 moves to a "top portion" of ferromagnetic housing 104. Thus, because magnetic flux lines 120 are attracted to ferromagnetic ball 112, magnetic flux lines 120 are steered to the top portion of ferromagnetic housing 104.

Figure 6:
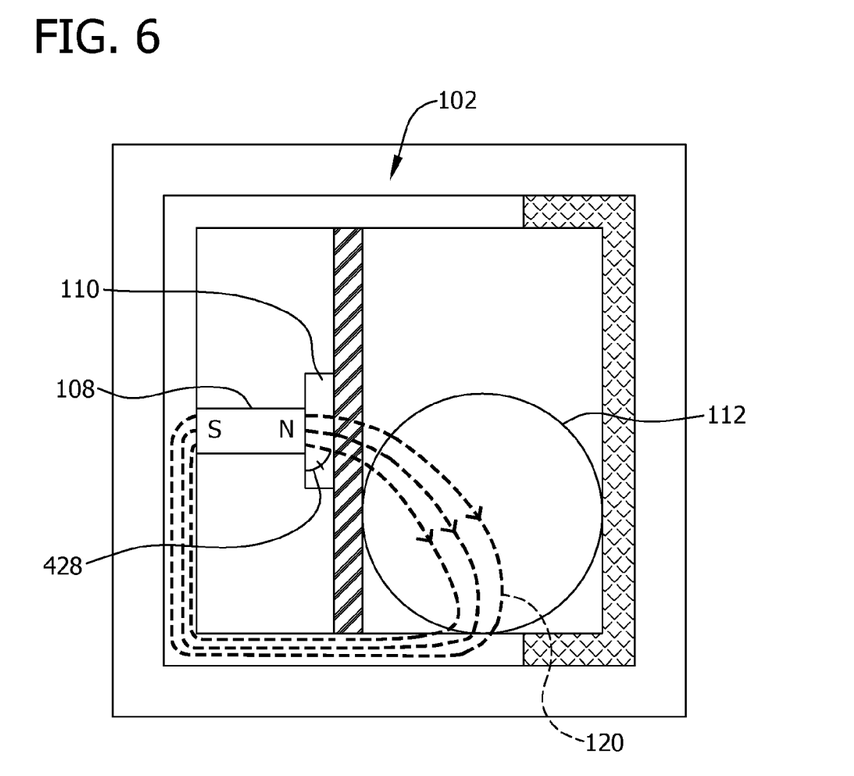
FIG. 6 is a block diagram illustrating a path of a plurality of magnetic flux lines emitted from a permanent magnet inside a relative bearing sensor.
Figure 7:
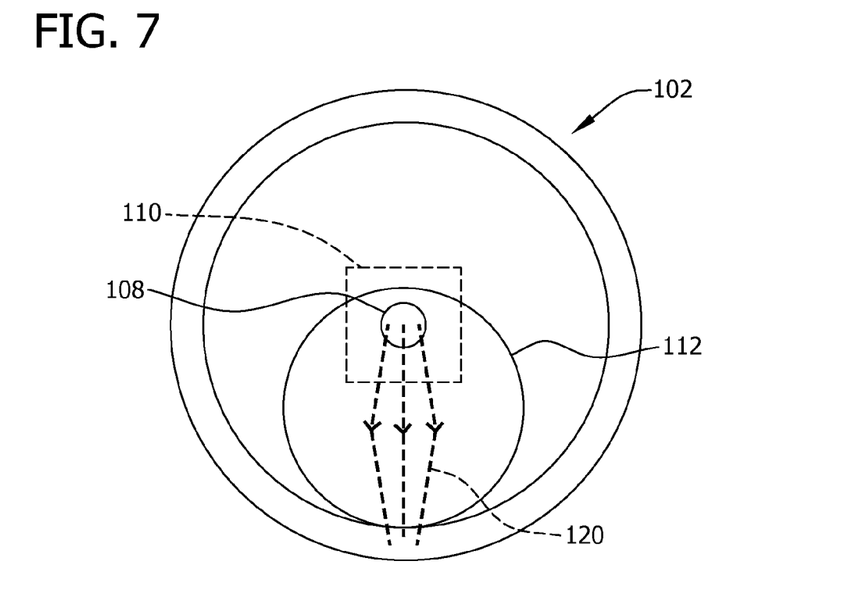
FIG. 7 is a cross section of a relative bearing sensor illustrating a path of a plurality of magnetic flux lines emitted from a permanent magnet inside the relative bearing sensor.

With reference now to FIGS. 6 and 7, due to a second orientation of well logging tool 101, ferromagnetic ball 112 within relative bearing sensor 102 moves to a "bottom portion" of ferromagnetic housing 104. Thus, because magnetic flux lines 120 are attracted to ferromagnetic ball 112, magnetic flux lines 120 are steered to the bottom portion of ferromagnetic housing 104. Therefore, as the orientation of well logging tool 101 changes, a location of ferromagnetic ball 112 within relative bearing sensor 102 changes, and more specifically, a location of ferromagnetic ball 112 within ferromagnetic housing 104 changes. In addition, since magnetic flux lines 120 are steered in the direction of ferromagnetic ball 112, an angle of a path in which magnetic flux lines 120 travel with respect to a plane perpendicular to permanent magnet 108 (e.g., an angle of magnetic flux lines 120 as they pass PCB 106) changes as a location of ferromagnetic ball 112 changes (e.g., see flux angle 128 in FIG. 1, flux angle 328 in FIG. 4, and flux angle 428 in FIG. 6). Therefore, understanding that an angle of a path from which magnetic flux lines 120 travel changes with respect to an orientation of relative bearing sensor 102, an orientation of well logging tool 101 can be determined from an angle of a path of magnetic flux lines 120, as described in detail below.

In embodiments, flux angle measuring component 206, when executed by processor 214, causes processor 214 to calculate a flux angle of magnetic flux lines 120 emitted from permanent magnet 108. Memory component 208, when executed by processor 214, causes processor 214 to access a flux angle table (not shown) from flux angle data 212. In embodiments, each flux angle in a flux angle table corresponds to an orientation of well logging tool 101. For example, a 90° angle listed in the flux angle table may indicate that well logging tool 101 is in an upright position, whereas a 45° angle listed in the flux angle table may indicate that well logging tool 101 is rotated a quarter of a turn from an upright position. Orientation component 208, when executed by processor 214, causes processor 214 to determine an orientation of well logging tool 101 by comparing the determined flux angle of magnetic flux lines 120 (e.g., see flux angle 128 in FIG. 1, flux angle 328 in FIG. 4, and flux angle 428 in FIG. 6) with one or more predefined flux angles in the flux angle table. For example, with reference to FIG. 4, if it is determined that the flux angle 328 of magnetic flux lines 120 is 75°, orientation component 208 causes processor 214 to search the flux angle table for a predefined flux angle of 75° in the flux angle table. Once the predefined flux angle of 75° is found, an orientation corresponding to the predefined flux angle of 75° is obtained from the flux angle table, and an orientation of well logging tool 101 is determined.

In a further embodiment, orientation component 208 may determine an orientation of well logging tool 101 by calculating a difference between a standard flux angle that may, for example, correspond to well logging tool 101 being in an upright position, with a current flux angle of magnetic flux lines 120. Based on a difference between the standard flux angle of magnetic flux lines 120 (e.g., 90°) and a current flux angle of magnetic flux lines 120, an orientation of well logging tool 101 may be determined. Thus, in embodiments, flux angle measuring component 208 may cause processor 214 to detect a change in a flux angle of magnetic flux lines 120 and calculate a change in a flux angle of magnetic flux lines 120 to determine an orientation of well logging tool 101 based on a change in the flux angle from, for example, the standard flux angle, or in some embodiments, a previously determined flux angle.

One of ordinary skill in the art will appreciate that a plurality of relative bearing sensors may be used to determine an orientation of, for example, a well logging tool. For example, in one embodiment, well logging tool 101 may utilize three separate relative bearing sensors, wherein each of the three relative bearing sensors corresponds to a plane, for example, the x, y, or z plane. Thus, utilizing a plurality of relative bearing sensors enables an orientation of a device, such as a well logging tool, to be determined with respect to each of the x, y, and z planes by determining flux angles of each of the relative bearing sensors, and based on the determined flux angles of each of the relative bearing sensors, determining an orientation of well logging tool 101.

Figure 8:
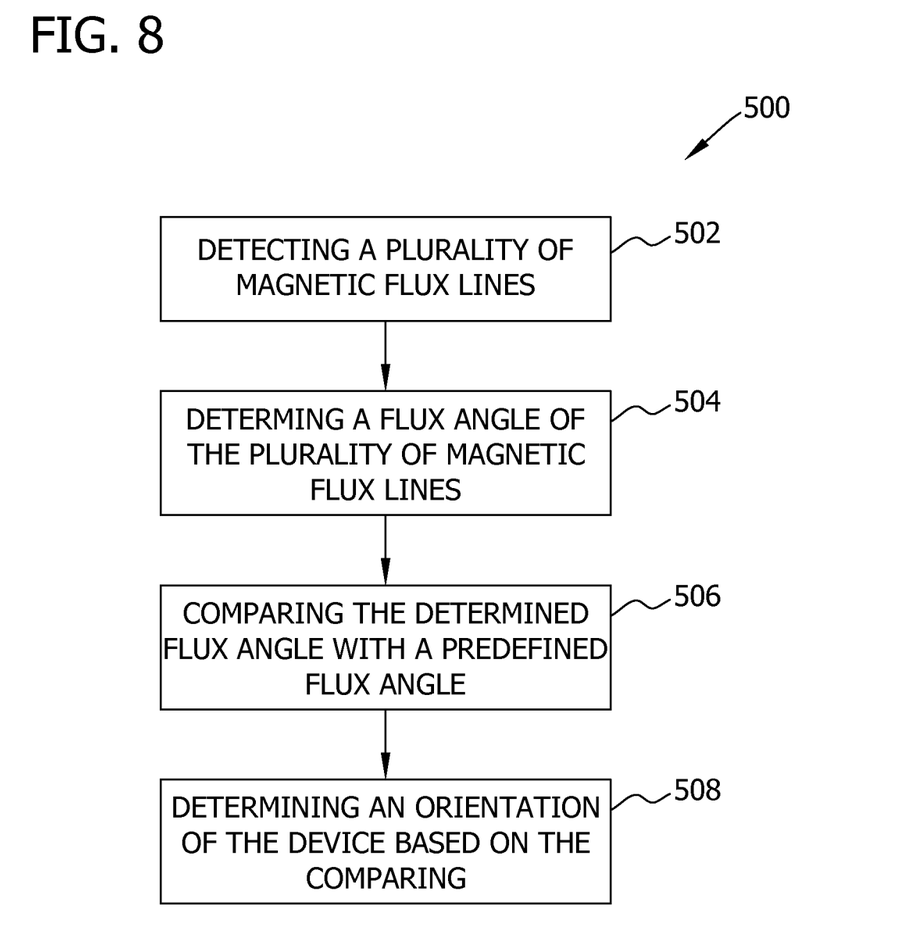
FIG. 8 is a flow diagram of an exemplary method for determining an orientation of a well logging tool.

Referring next to 5, a flow diagram of an exemplary method for determining an orientation of well logging tool 101 is provided. At 502, a plurality of magnetic flux lines (e.g., magnetic flux lines 120) emitted from a permanent magnet (e.g., permanent magnet 108) are detected via, for example, a magnetic flux sensor (e.g., magnetic flux sensor 110). At 504, a flux angle of magnetic flux lines 120 is determined by comparing the determined flux angle of magnetic flux lines 120 with a predefined flux angle at 506. At 508, an orientation of a device, such as well logging tool 101 may be determined based on comparing the determined flux angle of magnetic flux lines 120 with the predefined flux angle.

As mentioned above, to determine a flux angle of magnetic flux lines 120, a flux angle table may be accessed. In embodiments, the flux angle table includes a plurality of flux angles that correspond to an orientation of well logging tool 101. For example, a 90° angle listed in the flux angle table may indicate that well logging tool 101 is in an upright position, whereas a 45° angle listed in the flux angle table may indicate that well logging tool 101 is rotated a quarter of a turn from the upright position. Thus, an orientation of well logging tool 101 may be calculated/determined by comparing the flux angle of magnetic flux lines 120 with one or more predefined flux angles in the flux angle table.

An orientation of well logging tool 101 may also be determined by calculating a difference between a standard flux angle, which may correspond to well logging tool 101 being in an upright position, with a current flux angle of magnetic flux lines 120. Based on a difference between the standard flux angle of magnetic flux lines 120 and the current flux angle of magnetic flux lines 120, an orientation of well logging tool 101 may be determined. Thus, when a change in a flux angle of magnetic flux lines 120 is detected, the change in a flux angle of magnetic flux lines 120 is calculated to determine an orientation of well logging tool 101. One of ordinary skill in the art will appreciate that the standard flux angle may be any angle that corresponds to a predefined position of well logging tool 101.

In further embodiments, magnetic flux sensor 110 may be programmed to periodically determine an orientation of well logging tool 101. Thus, instead of, or in addition to, determining an orientation of well logging tool 101 once a change in a flux angle of magnetic flux lines 120 is detected, magnetic flux sensor 110 may be programmed to determine an orientation of well logging tool periodically via predefined time intervals. In embodiments, magnetic flux sensor 110 may be programmed to determine an orientation of well logging tool 101 after a predefined time period has elapsed since a change in a flux angle of magnetic flux lines 120 has been detected/determined. Thus, instead of, or in addition to, determining an orientation of well logging tool 101 once a change in a flux angle of magnetic flux lines 120 is detected, magnetic flux sensor 110 may be programmed to determine an orientation of well logging tool after a predefined period of time has elapsed since a change in a flux angle of magnetic flux lines 120 has been detected/determined.

While some embodiments of the disclosure contemplate execution of the operations illustrated in FIG. 8 by relative bearing sensor 102, in some embodiments, a computing device separate from relative bearing sensor 102 may execute one or more of the operations.

Exemplary Operating Environment

A relative bearing sensor or computing device such as is described herein has one or more processors or processing units, system memory, and some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal, such as a carrier wave or other transport mechanism, and include any information delivery media. Combinations of any of the above are also included within the scope of computer readable media.

The controller/computer may operate in a networked environment using logical connections to one or more remote computers, such as a remote computer. Although described in connection with an exemplary computing system environment, embodiments of the present disclosure are operational with numerous other general purpose or special purpose computing system environments or configurations. The computing system environment is not intended to suggest any limitation as to the scope of use or functionality of any aspect of the present disclosure. Moreover, the computing system environment should not be interpreted as having any dependency or requirement relating to any one or combination of components illustrated in the exemplary operating environment. Examples of well known computing systems, environments, and/or configurations that may be suitable for use with aspects of the present disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the present disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the present disclosure may be implemented with any number and organization of such components or modules. For example, aspects of the present disclosure are not limited to the specific computer-executable instructions or the specific components or modules illustrated in the figures and described herein. Other embodiments of the present disclosure may include different computer-executable instructions or components having more or less functionality than illustrated and described herein. Aspects of the present disclosure may also be practiced in distributed computing environments where tasks are performed by remote processing devices that are linked through a communications network. In a distributed computing environment, program modules may be located in both local and remote computer storage media including memory storage devices.

The embodiments illustrated and described herein as well as embodiments not specifically described herein but within the scope of aspects of the invention constitute exemplary means for calculating an orientation of a well logging tool.

The order of execution or performance of the operations in embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

When introducing elements of aspects of the present disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the present disclosure in detail, it will be apparent that modifications and variations are possible without departing from the scope of aspects of the present disclosure as defined in the appended claims. As various changes could be made in the above constructions, products, and methods without departing from the scope of aspects of the present disclosure, it is intended that all matter contained in the above description and shown in the accompanying drawings shall be interpreted as illustrative and not in a limiting sense.

This written description uses examples to disclose the claimed subject matter, including the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A relative bearing sensor for determining an orientation of a device, the relative bearing sensor comprising:
   a ferromagnetic housing, the ferromagnetic housing comprising:
      a ferromagnetic ball configured to roll with respect to an orientation of the ferromagnetic housing;
      a magnetic flux sensor;
      a permanent magnet configured to emit a plurality of magnetic flux lines through the magnetic flux sensor, the plurality of magnetic flux lines steered by a location of the ferromagnetic ball; and
   a processor programmed to:
      determine a flux angle of the plurality of magnetic flux lines;
      compare the determined flux angle with a predefined flux angle; and
      determine an orientation of the device based on the comparing.

2. A relative bearing sensor in accordance with claim 1, wherein the ferromagnetic housing is cylindrical.

3. A relative bearing sensor in accordance with claim 2, wherein the cylindrical ferromagnetic housing comprises a magnetic first end and a non-magnetic second end opposite the magnetic first end.

4. A relative bearing sensor in accordance with claim 1, wherein the ferromagnetic housing further comprises a printed circuit board (PCB) comprising a first surface and a second surface opposite the first surface, and wherein the magnetic flux sensor is coupled to the first surface of the PCB.

5. A relative bearing sensor in accordance with claim 4, wherein the ferromagnetic ball is moveably positioned with respect to the second surface of the PCB.

6. A relative bearing sensor in accordance with claim 5, wherein the ferromagnetic ball is moveably positioned with respect the non-magnetic end portion of ferromagnetic housing.

7. A relative bearing sensor in accordance with claim 1, wherein, due to a gravitational force, the ferromagnetic ball is movable based on the orientation of the device.

8. A relative bearing sensor in accordance with claim 1, wherein the predefined flux angle corresponds to a particular orientation of the device.

9. A relative bearing sensor in accordance with claim 1, further comprising means for calculating the orientation of the device.

10. A method for determining an orientation of a device, the method comprising:
    detecting a plurality of magnetic flux lines emitted from a permanent magnet adjacent to the magnetic flux sensor that are steered by a ferromagnetic ball, wherein the plurality of magnetic flux lines are detected by a magnetic flux sensor and pass through the magnetic flux sensor and a printed circuit board (PCB) coupled to the magnetic flux sensor, and wherein the ferromagnetic ball is selectively movable with respect to the PCB;
    determining a flux angle of the plurality of magnetic flux lines;
    comparing the determined flux angle with a predefined flux angle; and
    determining an orientation of the device based on the comparing.

11. The method in accordance with claim 10, wherein the flux angle of the plurality of magnetic flux lines is changed based on a position of the ferromagnetic ball.

12. One or more non-transitory computer-readable media having computer-executable components, the components comprising:
    a flux angle measuring component that when executed by at least one processor causes the at least one processor to calculate a flux angle of a plurality of magnetic flux lines emitted from a permanent magnet in a relative bearing sensor coupled to a device;
    a memory component that when executed by at least one processor causes the at least one processor to access a predefined flux angle; and
    an orientation component that when executed by at least one processor causes the at least one processor to determine an orientation of the device by comparing the determined flux angle of the plurality of magnetic flux lines with the predefined flux angle.

13. A non-transitory computer-readable media in accordance with claim 12, further comprising a sensing component that when executed by at least one processor causes the at least one processor to detect a presents of the plurality of magnetic flux lines.

14. A non-transitory computer-readable media in accordance with claim 12, wherein the emitted magnetic flux lines are steered by a position of a ferromagnetic ball that is moveable with respect to an orientation of the device.

15. A non-transitory computer-readable media in accordance with claim 12, wherein the flux angle measuring component causes the at least one processor to detect a change in a flux angle of the plurality of magnetic flux lines.

16. A non-transitory computer-readable media in accordance with claim 15, wherein the flux angle measuring component causes the at least one processor to calculate the change in the flux angle of the plurality of magnetic flux lines and determine an orientation of the device based on the change in the flux angle.

17. A non-transitory computer-readable media in accordance with claim 12, wherein the flux angle measuring component causes the at least one processor to determine an orientation of the device by comparing the determined flux angle of the plurality of magnetic flux lines with the predefined flux angle.

\* \* \* \* \*